(12) United States Patent
Li et al.

(10) Patent No.: US 11,460,686 B2
(45) Date of Patent: Oct. 4, 2022

(54) PRISM DEVICE APPLIED TO PERISCOPE LENS MODULE AND PERISCOPE LENS MODULE

(71) Applicant: AAC Optics Solutions Pte. Ltd., Singapore (SG)

(72) Inventors: Linzhen Li, Shenzhen (CN); Jiliang Lu, Shenzhen (CN); Gang Li, Shenzhen (CN); Jin Zhang, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/945,944

(22) Filed: Aug. 3, 2020

(65) Prior Publication Data

US 2020/0379240 A1    Dec. 3, 2020

Related U.S. Application Data

(63) Continuation of application No. PCT/CN2019/089727, filed on Jun. 1, 2019.

(51) Int. Cl.
| | |
|---|---|
| *G02B 23/08* | (2006.01) |
| *G02B 5/04* | (2006.01) |
| *G02B 7/02* | (2021.01) |
| *G02B 7/18* | (2021.01) |

(52) U.S. Cl.
CPC .............. *G02B 23/08* (2013.01); *G02B 5/04* (2013.01); *G02B 7/02* (2013.01); *G02B 7/18* (2013.01)

(58) Field of Classification Search
CPC ... G02B 3/08; G02B 5/04; G02B 7/02; G02B 7/18
See application file for complete search history.

(56) References Cited

U.S. PATENT DOCUMENTS

| | | | |
|---|---|---|---|
| 2018/0239161 A1* | 8/2018 | Seol | G02B 7/1821 |
| 2018/0321504 A1* | 11/2018 | Hu | G02B 7/09 |
| 2019/0230262 A1* | 7/2019 | Wang | G03B 9/10 |

(Continued)

FOREIGN PATENT DOCUMENTS

| | | | | |
|---|---|---|---|---|
| WO | WO-2016178152 A1 * | 11/2016 | | G02B 27/646 |
| WO | WO-2018158590 A1 * | 9/2018 | | F03G 7/065 |

*Primary Examiner* — William R Alexander
*Assistant Examiner* — Sharrief I Broome
(74) *Attorney, Agent, or Firm* — W&G Law Group

(57) ABSTRACT

Provided is a prism device applied to a periscope lens module. The prism device includes: a bearing frame; a supporting-restoring assembly; a prism; and shape memory alloy wires configured to drive the supporting-restoring assembly and the prism to rotate relative to the bearing frame. Two opposite sides of the bearing frame are each provided with limiting grooves, two opposite sides of the supporting-restoring assembly are each provided with limiting arms inserted into the limiting grooves in one-to-one correspondence; and each limiting arm and a corresponding limiting groove form a clearance fit in such a manner that the limiting arm is movable in the limiting groove. In the present invention, two opposite sides of the bearing frame are provided with limiting grooves, and limiting arms on the supporting-restoring assembly are inserted into the limiting grooves, thereby preventing the supporting-restoring assembly from escaping from the bearing frame during use.

16 Claims, 12 Drawing Sheets

(56) References Cited

U.S. PATENT DOCUMENTS

2020/0073140 A1\* 3/2020 Eddington ............ G02B 7/1821
2020/0379243 A1\* 12/2020 Li ............................ G02B 5/04
2021/0223567 A1\* 7/2021 Li ......................... G02B 27/646

\* cited by examiner

PRISM DEVICE APPLIED TO PERISCOPE LENS MODULE AND PERISCOPE LENS MODULE

TECHNICAL FIELD

The present invention relates to the field of imaging devices, and particularly, to a prism device applied to a periscope lens module and a periscope lens module including the prism device.

BACKGROUND

A periscope lens module is a lens module having optical zoom completed inside a body thereof. The periscope lens module generally includes a lens device, a prism device, and an image sensor. For the periscope lens module in the related art, the prism device generally includes a bearing frame, a rotating base, a prism mounted to the rotating base, and a rotation driving assembly for driving the rotating base to rotate relative to a fixed base. However, in the related art, a rotation angle of the rotating base is limited by baffles at two sides of the fixed base. In this case, when a force applied on the rotation driving assembly deviates, it is easy to cause the rotating base to deviate, thereby resulting in imaging failure.

Therefore, it is needed to provide a new prism device applied to the periscope lens module, aiming to solve the problems described above.

SUMMARY

The present invention aims to provide a prism device applied to a periscope lens module, which has a limited rotation angle of the rotating base at adjusting an angle of the prism inside the lens.

The technical solution of the present invention is will be described as follows.

In order to achieve the above-mentioned purpose, the present invention provides a prism device applied to a periscope lens module. The prism device includes: a bearing frame; a supporting-restoring assembly rotatably mounted to the bearing frame; a prism mounted to the supporting-restoring assembly and rotatable with the supporting-restoring assembly; and a plurality of shape memory alloy wires connected between the bearing frame and the supporting-restoring assembly and configured to drive the supporting-restoring assembly and the prism to rotate relative to the bearing frame. Two opposite sides of the bearing frame are each provided with a plurality of limiting grooves, two opposite sides of the supporting-restoring assembly are each provided with a plurality of limiting arms, and the plurality of limiting arms is inserted into the plurality of limiting grooves in one-to-one correspondence; and each of the plurality of limiting arms and a corresponding limiting groove form a clearance fit in such a manner that the limiting arm is movable in the limiting groove.

As an improvement, the bearing frame includes a base having a cavity and a plurality of limiting covers; two opposite side edges of the base are each provided with a plurality of grooves, and the plurality of limiting covers is mounted to the plurality of grooves in one-to-one correspondence to form the plurality of limiting grooves; and each of the plurality of limiting grooves has a groove opening open towards the cavity.

As an improvement, the base includes a horizontal support plate, a vertical support plate, and two side plates; the vertical support plate extends from an end of the horizontal support plate while being bent upwards; each of the two side plates is provided between one side edge of the horizontal support plate and one side edge of the vertical support plate that are opposite to each other, and the horizontal support plate, the vertical support plate, and the two side plates define the cavity; the plurality of grooves is provided in the two side plates, and the plurality of limiting covers one-to-one corresponding to the plurality of grooves is mounted to the two side plates.

As an improvement, each of the limiting covers includes a top limiting plate and a side limiting plate provided at a side of the top limiting plate while being bent, the top limiting plate covers a top of one of the plurality of grooves corresponding to the limiting cover, and the side limiting plate covers a side of the one groove facing away from the cavity; and/or the plurality of limiting grooves includes an even number of limiting grooves symmetrically arranged at the two opposite sides of the bearing frame, and a number of the plurality of limiting arms is equal to a number of the plurality of limiting grooves.

As an improvement, the bearing frame further includes a protrusion provided in the cavity, and the supporting-restoring assembly is rotatably connected to the protrusion; and the plurality of shape memory alloy wires is spaced apart from each other and distributed around the protrusion.

As an improvement, the prism device applied to the periscope lens module further includes a ball. The supporting-restoring assembly is rotatably connected to the protrusion through the ball; a top of the protrusion includes an inclined surface inclined relative to both the horizontal support plate and the vertical support plate, and the inclined surface is provided with a locating groove for receiving and locating the ball; and a spherical arc recess for matching the ball is provided at a side of the supporting-restoring assembly facing towards the bearing frame.

As an improvement, the prism device applied to the periscope lens module further includes a magnet. The protrusion is provided with a mounting groove located between the locating groove and a bottom of the protrusion, and the magnet is received and located in the mounting groove for attracting and locating the ball and the supporting-restoring assembly.

As an improvement, the supporting-restoring assembly includes a shape memory alloy wire-supporting frame rotatably connected to the bearing frame, and an elastic support member arranged between the shape memory alloy wire-supporting frame and the prism and elastically connected to the bearing frame; the prism is mounted to the elastic support member; the plurality of limiting arms is arranged at two opposite side edges of the shape memory alloy wire-supporting frame, and the prism is mounted to the elastic support member; and the plurality of shape memory alloy wires is connected between the bearing frame and the shape memory alloy wire-supporting frame.

As an improvement, the elastic support member includes an elastic bracket elastically connected to the bearing frame, a holder provided between the elastic bracket and the shape memory alloy wire-supporting frame, and a prism support provided at a side of the elastic bracket facing away from the holder; and the prism is mounted to the prism support; and/or the shape memory alloy wire-supporting frame includes two first side edges that are spaced apart from each other, and two second side edges that are spaced apart from and opposite to each other and are vertically connected to the two first side edges; the plurality of limiting arms is arranged at the two first side edges; the plurality of shape memory alloy wires includes a first shape memory alloy wire, a second shape memory alloy wire, a third shape memory alloy wire, and a fourth shape memory alloy wire; the first shape memory alloy wire and the second shape memory alloy wire are respectively connected to the shape memory alloy wire-supporting frame and the bearing frame from the two first side edges, so as to drive the shape memory alloy wire-supporting frame to drive the prism to rotate about a first rotation center axis; the third shape memory alloy wire and the fourth shape memory alloy wire are respectively connected to the shape memory alloy wire-supporting frame and the bearing frame from the two second side edges, so as to drive the shape memory alloy wire-supporting frame to drive the prism to rotate about a second rotation center axis; and the first rotation center axis perpendicularly intersects the second rotation center axis.

The present invention further provides a periscope lens module, including a frame, a lens device mounted to a middle portion of the shell frame, an image sensor mounted to one end of the shell frame and located at an image side of the lens device, and the prism device applied to the periscope lens module as described above. The prism device applied to the periscope lens module is mounted to another end of the frame and is located at an object side of the lens device.

The present invention has following beneficial effect. In the present invention, two opposite sides of the bearing frame are provided with a plurality of limiting grooves, and a plurality of limiting arms on the supporting-restoring assembly are inserted into the limiting grooves in one-to-one correspondence such that each limiting arm is movable in a corresponding limiting groove, thereby preventing the supporting-restoring assembly from escaping from the bearing frame during use. Meanwhile, the shape memory alloy wires are used to drive the prism on the supporting-restoring assembly to rotate relative to the bearing frame, so that the prism can automatically correct an angle under driving of the shape memory alloy wire. Therefore, the prism device applied to the periscope lens module has a wider imaging angle and a better imaging effect.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

Figure 1:
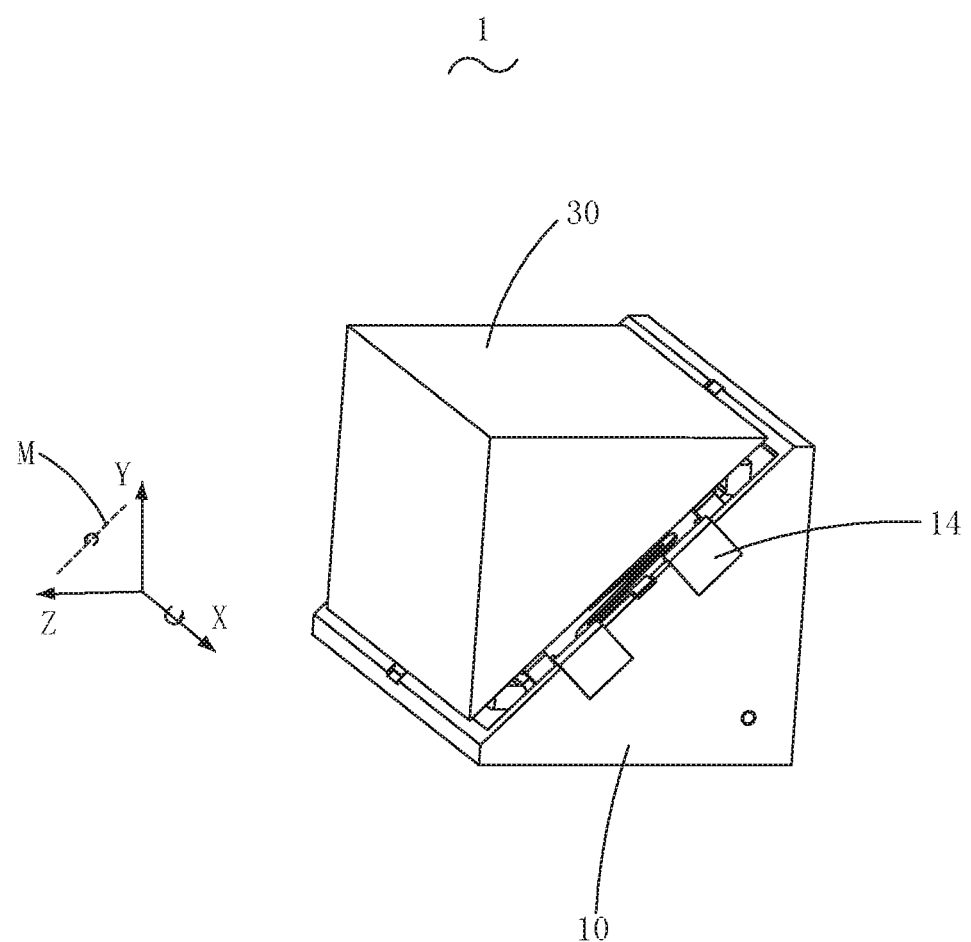
FIG. 1 is a perspective view of a prism device applied to a periscope lens module according to an embodiment of the present invention.

In the figures:
1: prism device applied to a periscope lens module; 10: bearing frame; 11. limiting groove; 111. groove opening; 12. snap groove; 13. base; 131. cavity; 132. groove; 133. horizontal support plate; 134. vertical support plate; 135. side plate; 14. limiting cover; 141. top limiting plate; 142. side limiting plate; 15. protrusion; 151. inclined surface; 152. locating groove; 153. mounting groove; 16. stepped rod; 161. first locating rod; 162. second locating rod; 163. third locating rod; 164. first rod body; 165. second rod body; 166. third rod body; 20. supporting-restoring assembly; 21. shape memory alloy wire-supporting frame; 211. limiting arm; 212. first side edge; 213. second side edge; 214. main plate body; 215. spherical arc recess; 216. spherical arc boss; 22. elastic support member; 221. elastic bracket; 222. holder; 223. prism support; 224. base plate; 225. elastic arm; 226. first fixed end; 227. second fixed end; 228. elastic bent portion; 229. first avoiding hole; 230. second avoiding hole; 23. connecting terminal; 231. first connecting terminal; 232. second connecting terminal; 233. third connecting terminal; 234. fourth connecting terminal; 30. prism; 40. shape memory alloy wire; 41. first shape memory alloy wire; 42. second shape memory alloy wire; 43. third shape memory alloy wire; 44. fourth shape memory alloy wire; 50. ball; 60. magnet; 70. shell frame; 80. lens device; and 90. image sensor.

DESCRIPTION OF EMBODIMENTS

The present invention will be further described in the following with reference to the accompany drawings and embodiments.

With reference to FIG. 1 to FIG. 11, an embodiment of the present invention provides a prism device 1 applied to a periscope lens module. The prism device 1 includes: a bearing frame 10; a supporting-restoring assembly 20 rotatably mounted to the bearing frame 10; a prism 30 mounted to the supporting-restoring assembly 20 and rotatable with the supporting-restoring assembly 20; and a plurality of shape memory alloy wires 40 connected between the bearing frame 10 and the supporting-restoring assembly 20 and for driving the supporting-restoring assembly 20 and the prism 30 to rotate relative to the bearing frame 10. The prism 30 mounted to the supporting-restoring assembly 20 can automatically correct an angle under driving of the shape memory alloy wires 40, so that the prism device 1 applied to the periscope lens module can have a more clear imaging effect.

The supporting-restoring assembly 20 includes a shape memory alloy wire-supporting frame 21 rotatably connected to the bearing frame 10, and an elastic support member 22 arranged between the shape memory alloy wire-supporting frame 21 and the prism 30 and elastically connected to the bearing frame 10. The prism 30 is mounted to the elastic support member 22, and the shape memory alloy wires 40 are connected between the bearing frame 10 and the shape memory alloy wire-supporting frame 21, so as to drive the shape memory alloy wire-supporting frame 21 to rotate relative to the bearing frame 10. Two opposite side edges of the shape memory alloy wire-supporting frame 21 are each provided with a plurality of limiting arms 211, and two opposite sides of the bearing frame 10 are each provided with a plurality of limiting grooves 11. The limiting arms 211 are inserted into the limiting grooves 11 in one-to-one correspondence. The limiting arm 211 is not contact with bottom and side edges of the corresponding limiting groove 11 to form a certain clearance therebetween, so that the limiting arm 211 and the limiting groove 11 form a clearance fit. Therefore, the limiting arm 211 is movable in the limiting groove 11, so that the prism 30 indirectly connected to the shape memory alloy wire-supporting frame 21 can rotate relative to the bearing frame 10 within a certain range, thereby preventing the shape memory alloy wire-supporting frame 21 from disengaging from the bearing frame 10. Meanwhile, the limiting groove 11 can roughly locate the supporting-restoring assembly 20.

Figure 2:
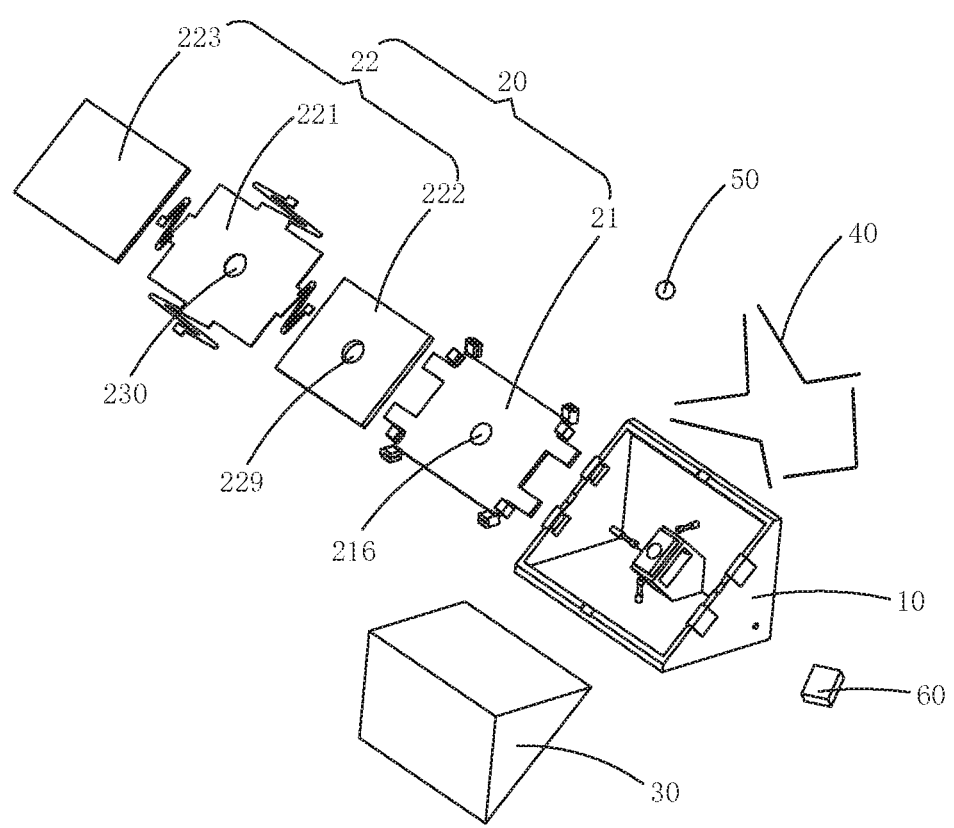
FIG. 2 is an explosive view of FIG. 1.
Figure 3:
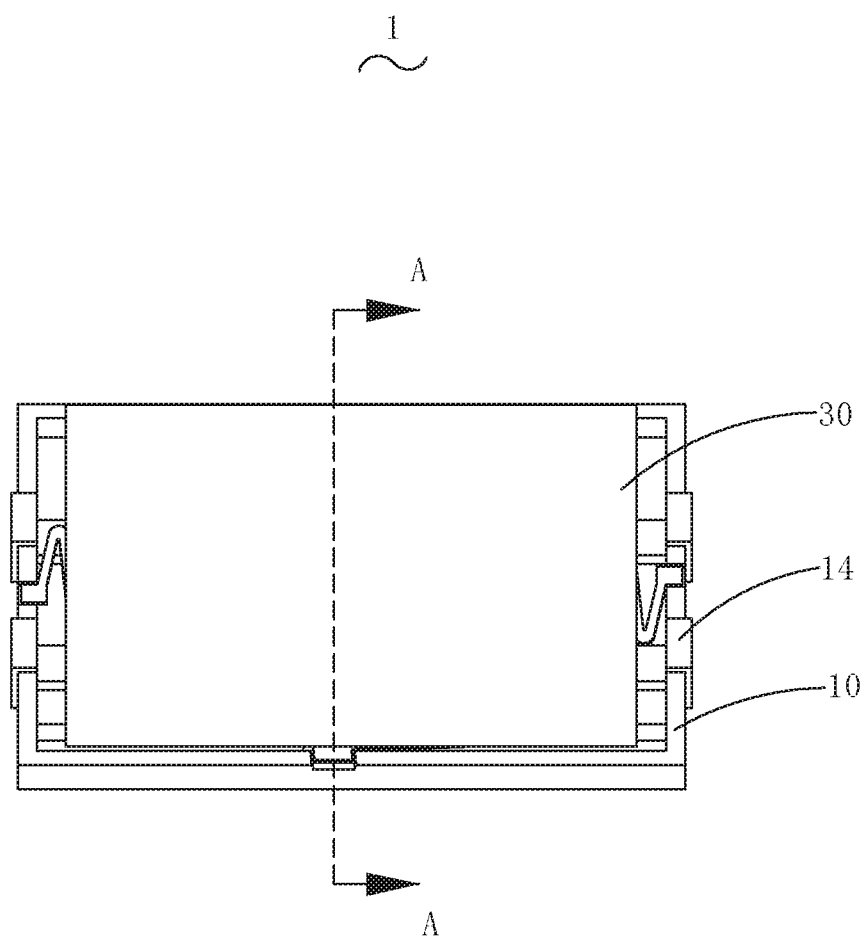
FIG. 3 is a front view of a prism device applied to a periscope lens module according to an embodiment of the present invention.
Figure 6:
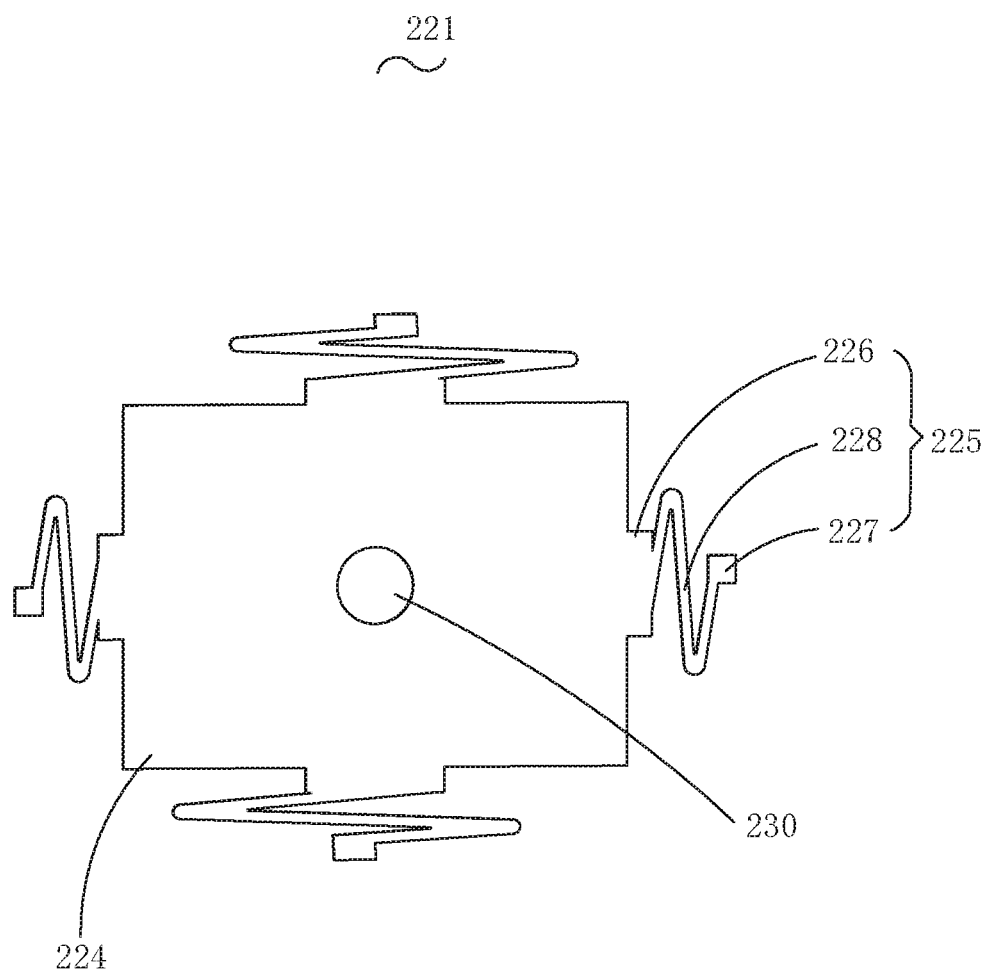
FIG. 6 is a perspective view of an elastic bracket according to an embodiment of the present invention.

With reference to FIG. 2 and FIG. 6, the elastic support member 22 includes an elastic bracket 221 elastically connected to the bearing frame 10, a holder 222 arranged between the elastic bracket 221 and the shape memory alloy wire-supporting frame 21, and a prism support 223 arranged at a side of the elastic bracket 221 facing away from the holder 222. The elastic bracket 221 includes a base plate 224, and a plurality of elastic arms 225 disposed at an outer edge of the base plate 224 and connected to the bearing frame 10. The base plate 224 is sandwiched between the holder 222 and the prism support 223. The prism 30 is mounted to the prism support 223. As an example, the prism 30 is glued to the prism support 223.

For example, the elastic arm 225 includes a first fixed end 226 fixed to the outer edge of the base plate 224, a second fixed end 227 connected to the bearing frame 10, and an elastic bent portion 228 bent and connected between the first fixed end 226 and the second fixed end 227. The bearing frame 10 is provided with a snap groove 12 for receiving and locating the second fixed end 227. The elastic bracket 221 is electrically connected to the bearing frame 10. In specific applications, a structure of the elastic arm 225 is not limited to this.

Figure 7:
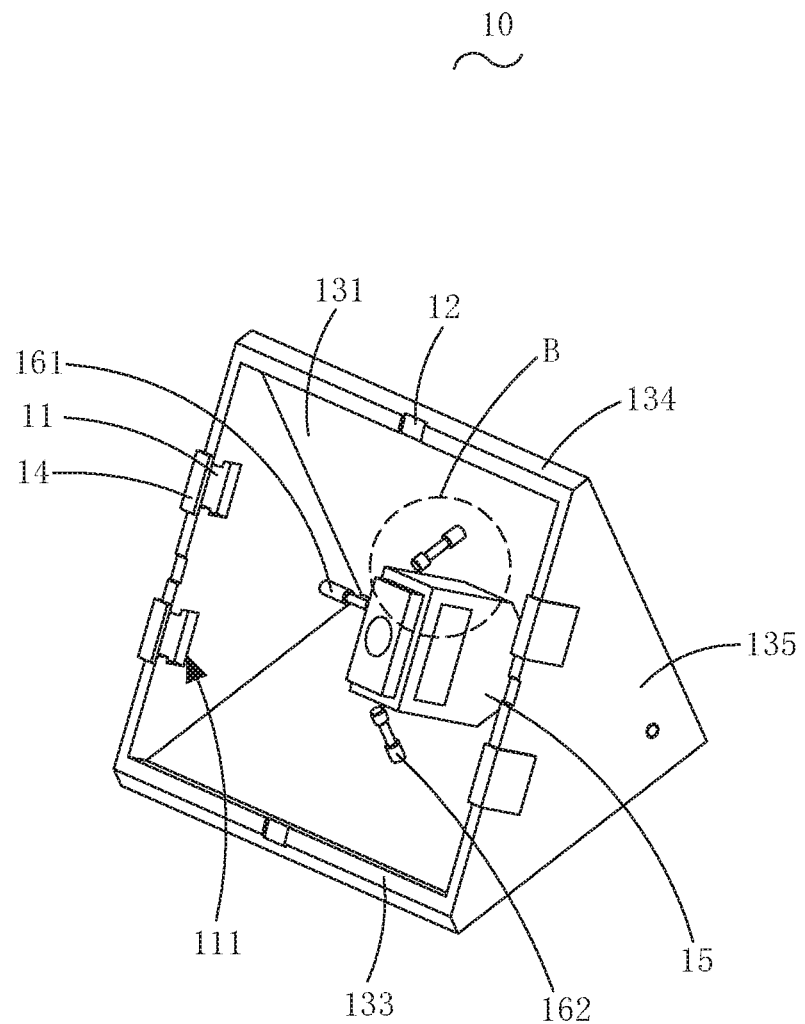
FIG. 7 is a perspective view of stepped rods being installed into a bearing frame according to an embodiment of the present invention.
Figure 8:
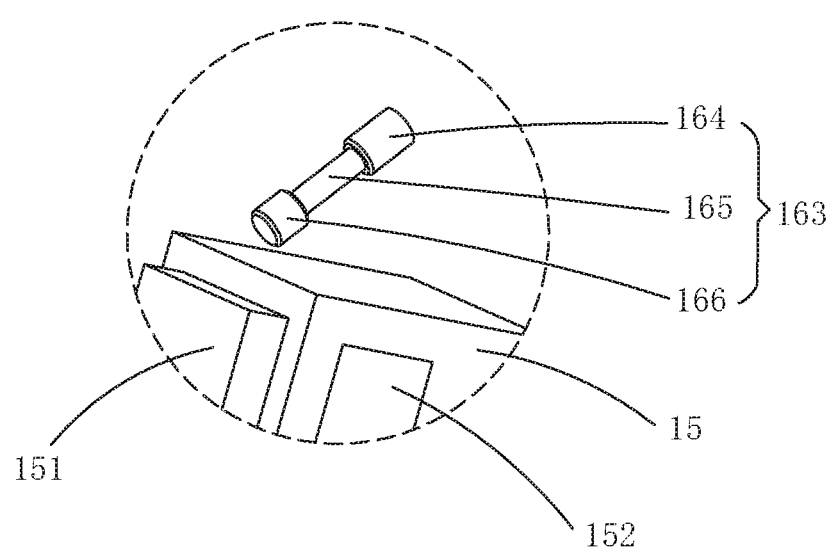
FIG. 8 is an enlarged view of a structure of part B shown in FIG. 7.
Figure 9:
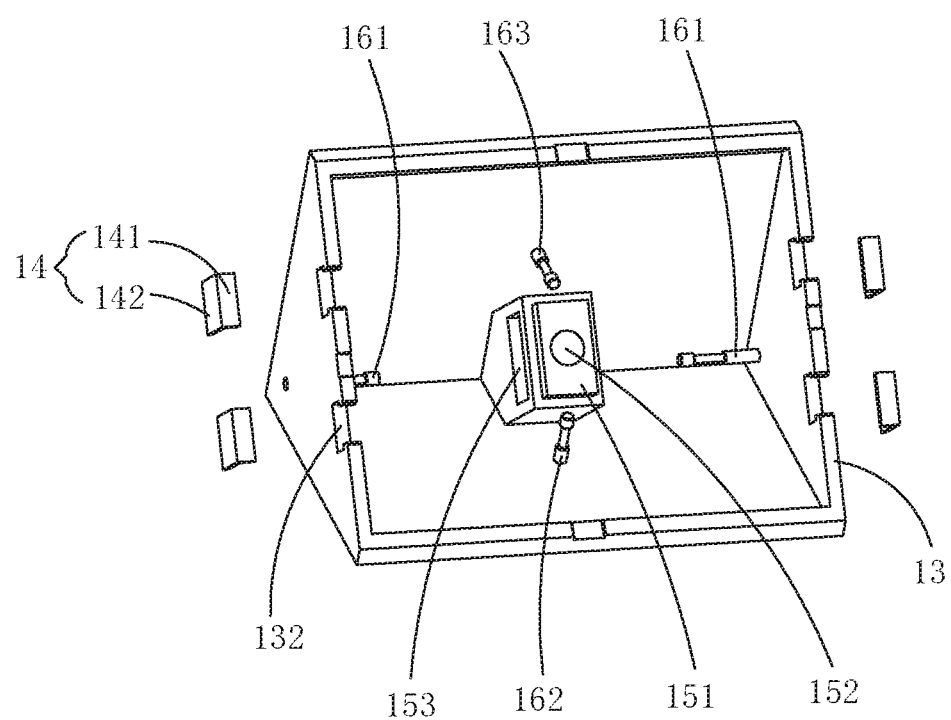
FIG. 9 is an explosive view of FIG. 8.

With further reference to FIG. 7 to FIG. 9, in this embodiment, the bearing frame 10 includes a base 13 having a cavity 131, and a plurality of limiting covers 14. Two opposite side edges of the base 13 are each provided with a plurality of grooves 132. The limiting covers 14 cover and are mounted to the grooves 132 in one-to-one correspondence, so as to form the limiting grooves 11 described above. Each limiting groove 11 has a groove opening 111 open towards the cavity 131, and the limiting arm 211 is inserted into the groove opening 111 and moves in the groove opening 111. In this way, the limiting arm 211 and the limiting groove 11 form the above-mentioned clearance fit.

The limiting cover 14 includes a top limiting plate 141 and a side limiting plate 142 provided at a side of the top limiting plate 141 while being bent. The top limiting portion covers a top of the groove 132, and the side limiting plate 142 covers a side of the groove 132 facing away from the cavity 131, thereby forming the limiting groove 11. In this embodiment, an even number of limiting grooves 11 are provided, and the even number of limiting grooves 11 are symmetrically arranged at two opposite sides of the bearing frame 10. In this embodiment, the number of the limiting arms 211 is equal to the number of the limiting grooves 11, and the limiting arms 211 are in one-to-one correspondences with the limiting grooves 11.

As an example, the base 13 includes a horizontal support plate 133, a vertical support plate 134, and two side plates 135. The vertical support plate 134 extends from an end of the horizontal support plate 133 while being bent upwards. Each of the two side plates 135 is provided between one side edge of the horizontal support the plate 133 and one side edge of the vertical support plate 134 that are opposite to each other, and the horizontal support plate 133, the vertical support plate 134, and the two side plates 135 define the cavity 131. The grooves 132 are formed in the two side plates 135, and the limiting covers 14 one-to-one corresponding to the grooves 132 are mounted to the two side plates 135 to form the limiting grooves 11.

Figure 10:
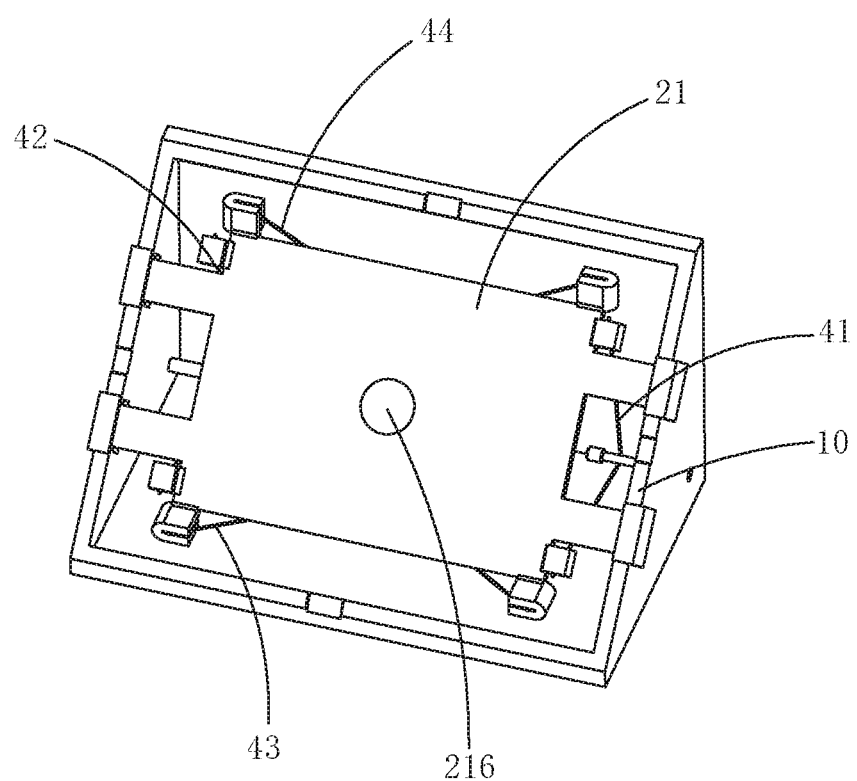
FIG. 10 is a perspective view of a prism device applied to a periscope lens module according to an embodiment of the present invention after removing a prism and an elastic support member.
Figure 11:
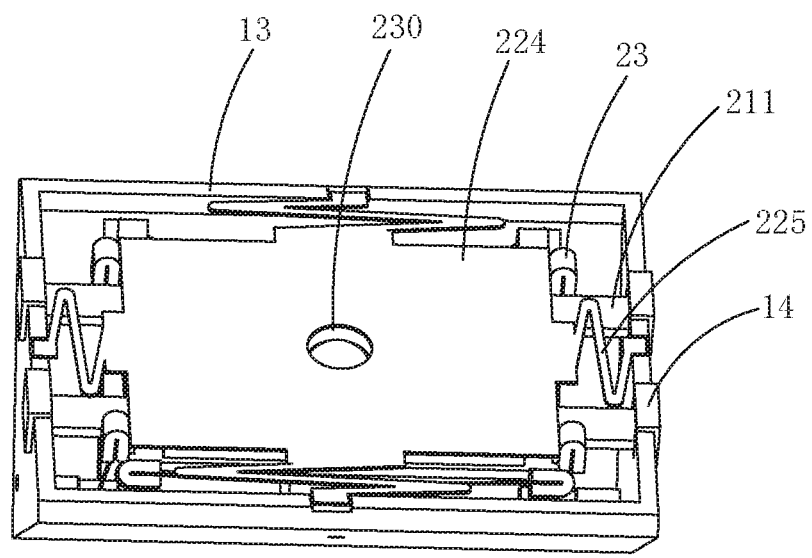
FIG. 11 is a perspective view of a prism device applied to a periscope lens module according to an embodiment of the present invention after removing a prism and a prism support.

With further reference to FIG. 2 and FIG. 10, the bearing frame 10 further includes a protrusion 15 provided in the cavity 131. The supporting-restoring assembly 20 is rotatably connected to the protrusion 15. The shape memory alloy wires 40 are spaced apart from each other and distributed around the protrusion 15. The shape memory alloy wires 40 include a first shape memory alloy wire 41, a second shape memory alloy wire 42, a third shape memory alloy wire 43 and a fourth shape memory alloy wire 44. The shape memory alloy wire-supporting frame 21 includes two first side edges 212 that are spaced apart from each other, and two second side edges 213 that are spaced apart from and opposite to each other and are vertically connected to the two first side edges 212. The limiting arms 211 are provided at the two first side edges 212. The first shape memory alloy wire 41 is connected between one first side edge 212 and one side plate 135, and the second shape memory alloy wire 42 is connected between the other first side edge 212 and the other side plate 135. The third shape memory alloy wire 43 is connected between one second side edge 213 and the horizontal support plate 133, and the fourth shape memory alloy wire 44 is connected between the other second side edge 213 and the vertical support plate 134.

In this embodiment, a top of the protrusion 15 includes an inclined surface 151 inclined relative to both the horizontal support plate 133 and the vertical support plate 134. The supporting-restoring assembly 20 uses the inclined surface 151 as a rotation connection fulcrum. The first shape memory alloy wire 41 and the second shape memory alloy wire 42 are respectively connected to the shape memory alloy wire-supporting frame 21 and the bearing frame 10 from the two first side edges 212, so as to drive the shape memory alloy wire-supporting frame 21 to drive the drive the prism 30 to rotate about a first rotation center axis, which is an inclined direction of the inclined surface 151 (a direction indicated by a dotted line M shown in FIG. 1). The third shape memory alloy wire 43 and the fourth shape memory alloy wire 44 are respectively connected to the shape memory alloy wire-supporting frame 21 and the bearing frame 10 from the two second side edges 213, so as to drive the shape memory alloy wire-supporting frame 21 to drive the prism 30 to rotate about a second rotation center axis (a direction indicated by an X axis shown in FIG. 1). That is, the third shape memory alloy wire 43 and the fourth shape memory alloy wire 44 are connected to the supporting-restoring assembly 20 and the bearing frame 10 from the horizontal support plate 133 and the vertical support plate 134, respectively, so as to drive the supporting-restoring assembly 20 to drive the prism 30 to rotate about the second rotation center axis, which perpendicularly intersects the first rotation center axis.

Figure 4:
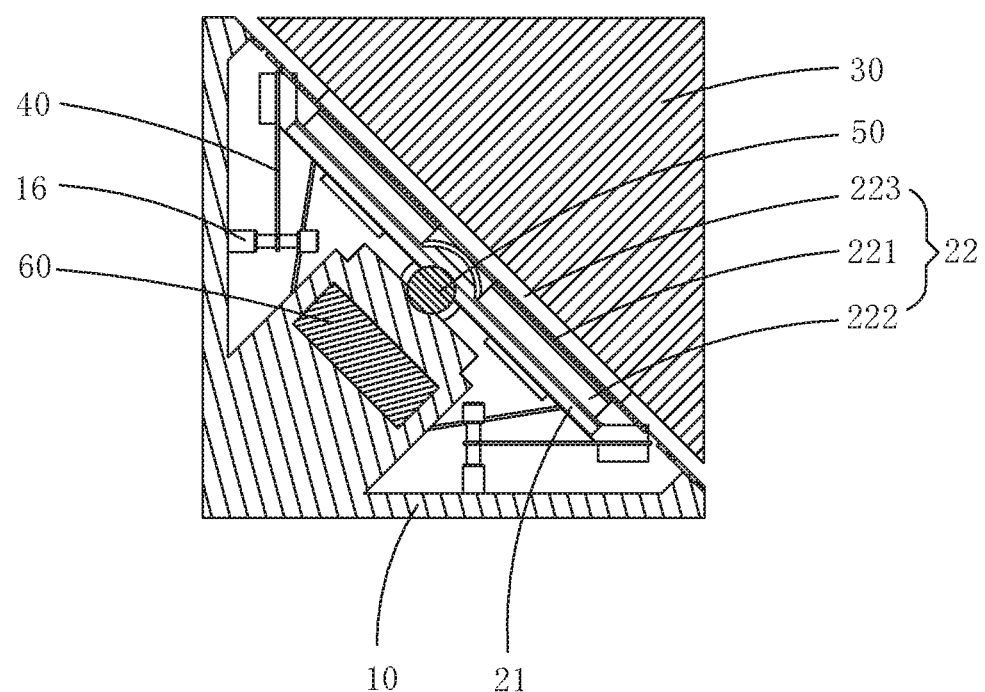
FIG. 4 is a cross-sectional view along A-A shown in FIG. 3.
Figure 5:
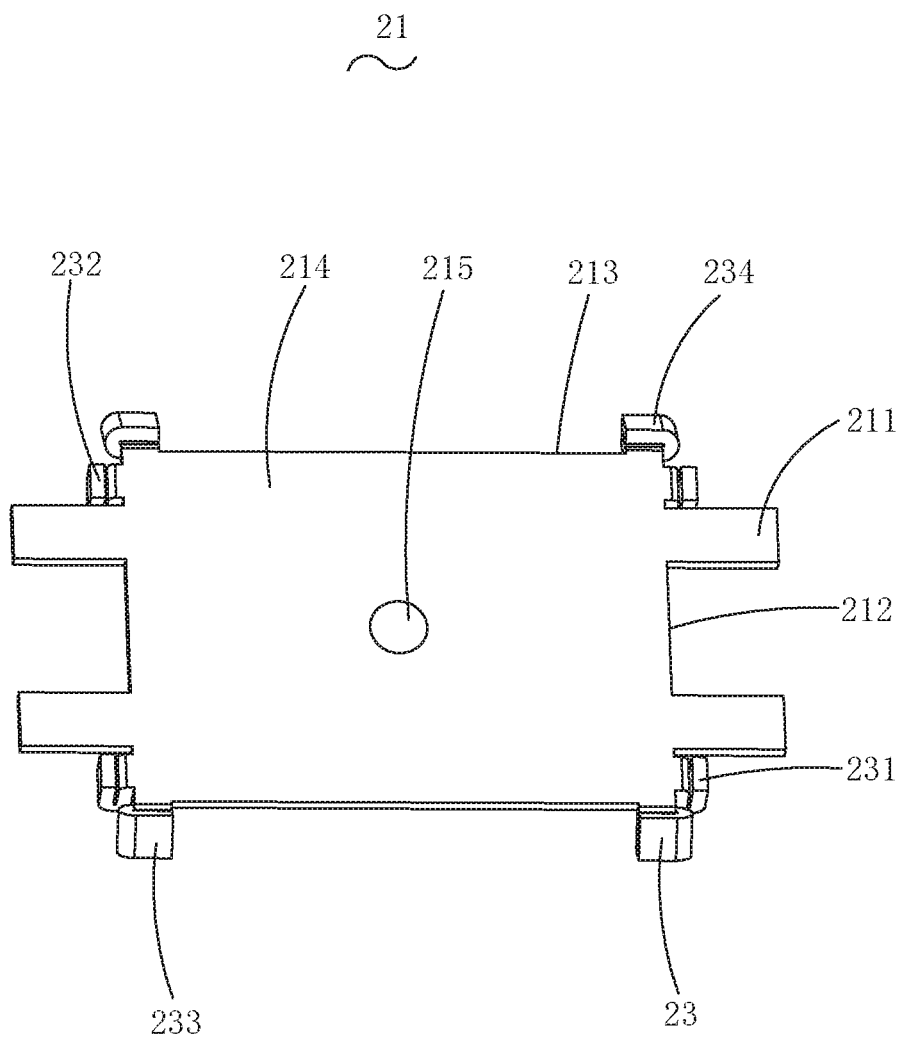
FIG. 5 is a perspective view of a shape memory alloy wire-supporting frame according to an embodiment of the present invention.

With reference to FIG. 4 and FIG. 9, as an example, the bearing frame 10 further includes two first locating rods 161 respectively protruding from the two side plates 135 and provided in the cavity 131, a second locating rod 162 protruding from the horizontal support plate 133 and provided in the cavity 131, and a third locating rod 163 protruding from the vertical support plate 134 and provided in the cavity 131. The shape memory alloy wire-supporting frame 21 further includes a main plate body 214 rotatably connected to the protrusion 15, and a plurality of connecting terminals 23 provided at an outer edge of the main plate body 214 and connected to the shape memory alloy wire 40. The limiting arms 211 are provided at the outer edge of the main plate body 214. The connecting terminals 23 include two first connecting terminals 231 spaced apart from each other and mounted to one first side edge 212, two second connecting terminal 232 spaced apart from each other and mounted to the other first side edge 212, two third connecting terminals 233 spaced apart from each other and mounted to one second side edge 213, and two fourth connecting terminals 234 spaced apart from each other and mounted to the other second side edge 213. Each connecting terminal 23 is inclined and protrudes from a side of the main plate body 214 facing away from the cavity 131, so as to form a receiving groove for receiving the holder 222, the elastic bracket 221 and the prism support 223. The first shape memory alloy wire 41 includes a middle portion hooked to one first locating rod 161, and two ends fixed to the first connecting terminals 231 of the shape memory alloy wire-supporting frame 21. The second shape memory alloy wire 42 includes a middle portion hooked to the other first locating rod 161, and two ends fixed to the second connecting terminals 232 of the shape memory alloy wire-supporting frame 21. The third shape memory alloy wire 43 includes a middle portion hooked to the second locating rod 162, and two ends fixed to the third connecting terminals 233 of the shape memory alloy wire-supporting frame 21. The fourth shape memory alloy wire 44 includes a middle portion hooked to the third locating rod 163, and two ends fixed to the fourth connecting terminals 234 of the shape memory alloy wire-supporting frame 21. In this way, each shape memory alloy wire 40 is formed into a "V" shape.

With further reference to FIG. 8, for example, each of the first locating rod 161, the second locating rod 162, and the third locating rod 163 is a stepped rod 16. The stepped rod 16 includes a first rod body 164, a second rod body 165, and a third rod body 166. The first rod body 164 is connected to the bearing frame 10, and the second rod body 165 is disposed between the first rod body 164 and the third rod body 166. Each of the first rod body 164 and the third rod body 166 has a larger outer diameter than the second rod body 165. The middle portion of each shape memory alloy wire 40 is hooked to the second rod body 165 of a corresponding stepped rod 16, thereby preventing the shape memory alloy wire 40 from falling off during shaking. Meanwhile, the stepped rod 16 may be directly formed onto the base 13 into one piece or be assembled to the base 13 by means of any existing assembling method. In this embodiment, the stepped rod 16 is mounted to the base 13, which can simplify a structure of the bearing frame 10 and reduce a manufacturing cost for the bearing frame 10.

The prism device 1 applied to the periscope lens module further includes a ball 50, and the shape memory alloy wire-supporting frame 21 is rotatably connected to the bearing frame 10 through the ball 50. The incident surface 151 is provided with a locating groove 152 for receiving and locating the ball 50, and the locating groove 152 is formed in a surface of the protrusion 15 facing towards the shape memory alloy wire-supporting frame 21. A spherical arc recess 215 for matching the ball 50 is provided at a side of the shape memory alloy wire-supporting frame 21 facing towards the bearing frame 10. The supporting-restoring assembly 20 rotates about the protrusion 15 by using the ball 50 as a rotation connection fulcrum.

As an example, the prism device 1 applied to the periscope lens module further includes a magnet 60, and the protrusion 15 is provided with a mounting groove 153 located between the locating groove and a bottom of the protrusion 15. The prism support 223 for fixing the prism 30 at the top of the supporting-restoring assembly 20 is made of a metal, and the magnet 60 is received and located in the mounting groove 153 for attracting and locating the ball 50 and the prism support 223, so as to achieving mounting and fixing of the supporting-restoring assembly 20 and the ball 50.

In this embodiment, a spherical arc boss 216 is further provided at a side of the main plate body 214 facing towards the prism 30, and the spherical arc recess 215 is formed by recessing and extending from a side of the main plate body 214 facing towards the bearing frame 10 to the spherical arc boss 216. The holder 222 is provided with a first avoiding hole 229 for avoiding the spherical arc boss 216, and the elastic bracket 221 is provided with a second avoiding hole 230 for avoiding the spherical arc boss 216. In this way, the holder 222 and the elastic bracket 221 can be roughly located onto the shape memory alloy wire-supporting frame 21. The prism support 223 is provided with no hole, so as to avoid interfering with imaging of the prism 30.

For the prism device 1 applied to the periscope lens module of the present invention, a plurality of shape memory alloy wires 40 are used to drive the prism 30 on the supporting-restoring assembly 20 to rotate in the bearing frame 10 about the first rotation center axis or about the second rotation center axis, so that the prism 30 can automatically correct an angle under driving of the shape memory alloy wires 40. Therefore, the prism device 1 applied to the periscope lens module has a wider imaging angle and a better imaging effect. The shape memory alloy wire 40 can form a memory effect under a command issued by the program to generate a driving force.

In a specific operation, as shown in FIG. 1, when the first shape memory alloy wire 41 is energized to be heated and shortened, the supporting-restoring assembly 20 is applied with an obliquely downward pulling force, so that the supporting-restoring assembly 20 rotates in one direction about the axis indicated by the dotted line M by using the ball 50 as the fulcrum. When the second shape memory alloy wire 42 is energized to be heated and shortened, the prism 30 rotates relative to the fixing base in an opposite direction about the axis indicated by the dotted line M. When the third shape memory alloy wire 43 is energized to be heated and shortened, the prism 30 can rotate relative to the fixed base in one direction about the X axis. When the fourth shape memory alloy wire 44 is energized to be heated and shortened, the prism 30 can rotate relative to the fixed base in an opposite direction about the X axis. The shape memory alloy wire 40 of the present invention may also be referred to as an SMA wire, which will not be described in details herein.

Figure 12:
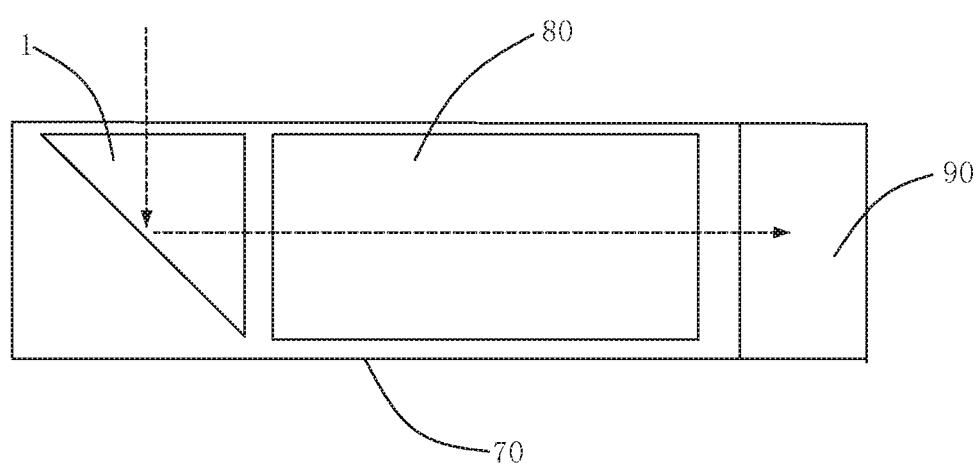
FIG. 12 is a perspective view of a periscope lens module according to an embodiment of the present invention.

With reference to FIG. 12, the present invention further provides a periscope lens module, including a shell frame 70, a lens device 80, an image sensor 90, and the prism device 1 applied to the periscope lens module as described above. The lens device 80 is mounted to a middle portion of the shell frame 70. The image sensor 90 is mounted to an end of the shell frame 70 and located at an image side of the lens device 80. The prism device 1 applied to the periscope lens module is mounted to the other end of the shell frame 70 and located at an object side of the lens device 80. Light is reflected by the prism device 1 applied to the periscope lens module and then reaches the image sensor 90 in a straight-line direction along the axis of the lens device 80, so as to achieve imaging. The dotted line shown in FIG. 12 is a light transmission direction. The periscope lens module can be applied to an electronic device with an imaging function. For example, the electronic device with the imaging function is a mobile phone or a camera.

The above description merely illustrates some embodiments of the present invention. It should be noted that those skilled in the art can make improvements without departing from a creative concept of the present invention, but all these improvements shall fall into a scope of the present invention.

What is claimed is:

1. A prism device applied to a periscope lens module, wherein the prism device comprises:
    a bearing frame;
    a supporting-restoring assembly rotatably mounted to the bearing frame;
    a prism mounted to the supporting-restoring assembly and rotatable with the supporting-restoring assembly; and
    a plurality of shape memory alloy wires connected between the bearing frame and the supporting-restoring assembly and configured to drive the supporting-restoring assembly and the prism to rotate relative to the bearing frame,
    wherein two opposite sides of the bearing frame are each provided with a plurality of limiting grooves, two opposite sides of the supporting-restoring assembly are each provided with a plurality of limiting arms, and the plurality of limiting arms is inserted into the plurality of limiting grooves in one-to-one correspondence; and each of the plurality of limiting arms and a corresponding limiting groove form a clearance fit in such a manner that the limiting arm is movable in the limiting groove, the supporting-restoring assembly comprises a shape memory alloy wire-supporting frame rotatably connected to the bearing frame, and an elastic support member arranged between the shape memory alloy wire-supporting frame and the prism and elastically connected to the bearing frame; the prism is mounted to the elastic support member; the plurality of limiting arms is arranged at two opposite side edges of the shape memory alloy wire-supporting frame, and the prism is mounted to the elastic support member; and the plurality of shape memory alloy wires is connected between the bearing frame and the shape memory alloy wire-supporting frame.

2. The prism device applied to the periscope lens module as described in claim 1, wherein the bearing frame comprises a base having a cavity and a plurality of limiting covers; two opposite side edges of the base are each provided with a plurality of grooves, and the plurality of limiting covers is mounted to the plurality of grooves in one-to-one correspondence to form the plurality of limiting grooves; and each of the plurality of limiting grooves has a groove opening open towards the cavity.

3. The prism device applied to the periscope lens module as described in claim 2, wherein the base comprises a horizontal support plate, a vertical support plate, and two side plates; the vertical support plate extends from an end of the horizontal support plate while being bent upwards; each of the two side plates is provided between one side edge of the horizontal support plate and one side edge of the vertical support plate that are opposite to each other, and the horizontal support plate, the vertical support plate, and the two side plates define the cavity; the plurality of grooves is provided in the two side plates, and the plurality of limiting covers one-to-one corresponding to the plurality of grooves is mounted to the two side plates.

4. The prism device applied to the periscope lens module as described in claim 3, wherein each of the limiting covers comprises a top limiting plate and a side limiting plate provided at a side of the top limiting plate while being bent, the top limiting plate covers a top of one of the plurality of grooves corresponding to the limiting cover, and the side limiting plate covers a side of the one groove facing away from the cavity; and/or
    the plurality of limiting grooves comprises an even number of limiting grooves symmetrically arranged at the two opposite sides of the bearing frame, and a number of the plurality of limiting arms is equal to a number of the plurality of limiting grooves.

5. The prism device applied to the periscope lens module as described in claim 3, wherein the bearing frame further comprises a protrusion provided in the cavity, and the supporting-restoring assembly is rotatably connected to the protrusion; and the plurality of shape memory alloy wires is spaced apart from each other and distributed around the protrusion.

6. The prism device applied to the periscope lens module as described in claim 5, further comprising a ball, wherein the supporting-restoring assembly is rotatably connected to the protrusion through the ball; a top of the protrusion comprises an inclined surface inclined relative to both the horizontal support plate and the vertical support plate, and the inclined surface is provided with a locating groove for receiving and locating the ball; and a spherical arc recess for matching the ball is provided at a side of the supporting-restoring assembly facing towards the bearing frame.

7. The prism device applied to the periscope lens module as described in claim 6, further comprising a magnet, wherein the protrusion is provided with a mounting groove located between the locating groove and a bottom of the protrusion, and the magnet is received and located in the mounting groove for attracting and locating the ball and the supporting-restoring assembly.

8. The prism device applied to the periscope lens module as described in claim 1, wherein the elastic support member comprises an elastic bracket elastically connected to the bearing frame, a holder provided between the elastic bracket and the shape memory alloy wire-supporting frame, and a prism support provided at a side of the elastic bracket facing away from the holder; and the prism is mounted to the prism support; and/or
    the shape memory alloy wire-supporting frame comprises two first side edges that are spaced apart from each other, and two second side edges that are spaced apart from and opposite to each other and are vertically connected to the two first side edges; the plurality of limiting arms is arranged at the two first side edges; the plurality of shape memory alloy wires comprises a first shape memory alloy wire, a second shape memory alloy wire, a third shape memory alloy wire, and a fourth shape memory alloy wire; the first shape memory alloy wire and the second shape memory alloy wire are respectively connected to the shape memory alloy wire-supporting frame and the bearing frame from the two first side edges, so as to drive the shape memory alloy wire-supporting frame to drive the prism to rotate about a first rotation center axis; the third shape memory alloy wire and the fourth shape memory alloy wire are respectively connected to the shape memory alloy wire-supporting frame and the bearing frame from the two second side edges, so as to drive the shape memory alloy wire-supporting frame to drive the prism to rotate about a second rotation center axis; and the first rotation center axis perpendicularly intersects the second rotation center axis.

9. A periscope lens module, comprising a shell frame, a lens device mounted to a middle portion of the shell frame, an image sensor mounted to one end of the shell frame and located at an image side of the lens device, and a prism device applied to the periscope lens module, wherein the prism device applied to the periscope lens module is mounted to another end of the shell frame and is located at an object side of the lens device, wherein the prism device comprises:

a bearing frame;

a supporting-restoring assembly rotatably mounted to the bearing frame;

a prism mounted to the supporting-restoring assembly and rotatable with the supporting-restoring assembly; and a plurality of shape memory alloy wires connected between the bearing frame and the supporting-restoring assembly and configured to drive the supporting-restoring assembly and the prism to rotate relative to the bearing frame, wherein two opposite sides of the bearing frame are each provided with a plurality of limiting grooves, two opposite sides of the supporting-restoring assembly are each provided with a plurality of limiting arms, and the plurality of limiting arms is inserted into the plurality of limiting grooves in one-to-one correspondence; and each of the plurality of limiting arms and a corresponding limiting groove form a clearance fit in such a manner that the limiting arm is movable in the limiting groove, the supporting-restoring assembly comprises a shape memory alloy wire-supporting frame rotatably connected to the bearing frame, and an elastic support member arranged between the shape memory alloy wire-supporting frame and the prism and elastically connected to the bearing frame; the prism is mounted to the elastic support member; the plurality of limiting arms is arranged at two opposite side edges of the shape memory alloy wire-supporting frame, and the prism is mounted to the elastic support member; and the plurality of shape memory alloy wires is connected between the bearing frame and the shape memory alloy wire-supporting frame.

10. The periscope lens module as described in claim 9, wherein the bearing frame comprises a base having a cavity and a plurality of limiting covers; two opposite side edges of the base are each provided with a plurality of grooves, and the plurality of limiting covers is mounted to the plurality of grooves in one-to-one correspondence to form the plurality of limiting grooves; and each of the plurality of limiting grooves has a groove opening open towards the cavity.

11. The periscope lens module as described in claim 10, wherein the base comprises a horizontal support plate, a vertical support plate, and two side plates; the vertical support plate extends from an end of the horizontal support plate while being bent upwards; each of the two side plates is provided between one side edge of the horizontal support plate and one side edge of the vertical support plate that are opposite to each other, and the horizontal support plate, the vertical support plate, and the two side plates define the cavity; the plurality of grooves is provided in the two side plates, and the plurality of limiting covers one-to-one corresponding to the plurality of grooves is mounted to the two side plates.

12. The periscope lens module as described in claim 11, wherein each of the limiting covers comprises a top limiting plate and a side limiting plate provided at a side of the top limiting plate while being bent, the top limiting plate covers a top of one of the plurality of grooves corresponding to the limiting cover, and the side limiting plate covers a side of the one groove facing away from the cavity; and/or the plurality of limiting grooves comprises an even number of limiting grooves symmetrically arranged at the two opposite sides of the bearing frame, and a number of the plurality of limiting arms is equal to a number of the plurality of limiting grooves.

13. The periscope lens module as described in claim 11, wherein the bearing frame further comprises a protrusion provided in the cavity, and the supporting-restoring assembly is rotatably connected to the protrusion; and the plurality of shape memory alloy wires is spaced apart from each other and distributed around the protrusion.

14. The periscope lens module as described in claim 13, further comprising a ball, wherein the supporting-restoring assembly is rotatably connected to the protrusion through the ball; a top of the protrusion comprises an inclined surface inclined relative to both the horizontal support plate and the vertical support plate, and the inclined surface is provided with a locating groove for receiving and locating the ball; and a spherical arc recess for matching the ball is provided at a side of the supporting-restoring assembly facing towards the bearing frame.

15. The periscope lens module as described in claim 14, further comprising a magnet, wherein the protrusion is provided with a mounting groove located between the locating groove and a bottom of the protrusion, and the magnet is received and located in the mounting groove for attracting and locating the ball and the supporting-restoring assembly.

16. The periscope lens module as described in claim 9, wherein the elastic support member comprises an elastic bracket elastically connected to the bearing frame, a holder provided between the elastic bracket and the shape memory alloy wire-supporting frame, and a prism support provided at a side of the elastic bracket facing away from the holder; and the prism is mounted to the prism support; and/or the shape memory alloy wire-supporting frame comprises two first side edges that are spaced apart from each other, and two second side edges that are spaced apart from and opposite to each other and are vertically connected to the two first side edges; the plurality of limiting arms is arranged at the two first side edges; the plurality of shape memory alloy wires comprises a first shape memory alloy wire, a second shape memory alloy wire, a third shape memory alloy wire, and a fourth shape memory alloy wire; the first shape memory alloy wire and the second shape memory alloy wire are respectively connected to the shape memory alloy wire-supporting frame and the bearing frame from the two first side edges, so as to drive the shape memory alloy wire-supporting frame to drive the prism to rotate about a first rotation center axis; the third shape memory alloy wire and the fourth shape memory alloy wire are respectively connected to the shape memory alloy wire-supporting frame and the bearing frame from the two second side edges, so as to drive the shape memory alloy wire-supporting frame to drive the prism to rotate about a second rotation center axis; and
the first rotation center axis perpendicularly intersects
the second rotation center axis.

\* \* \* \* \*